Patented May 3, 1949

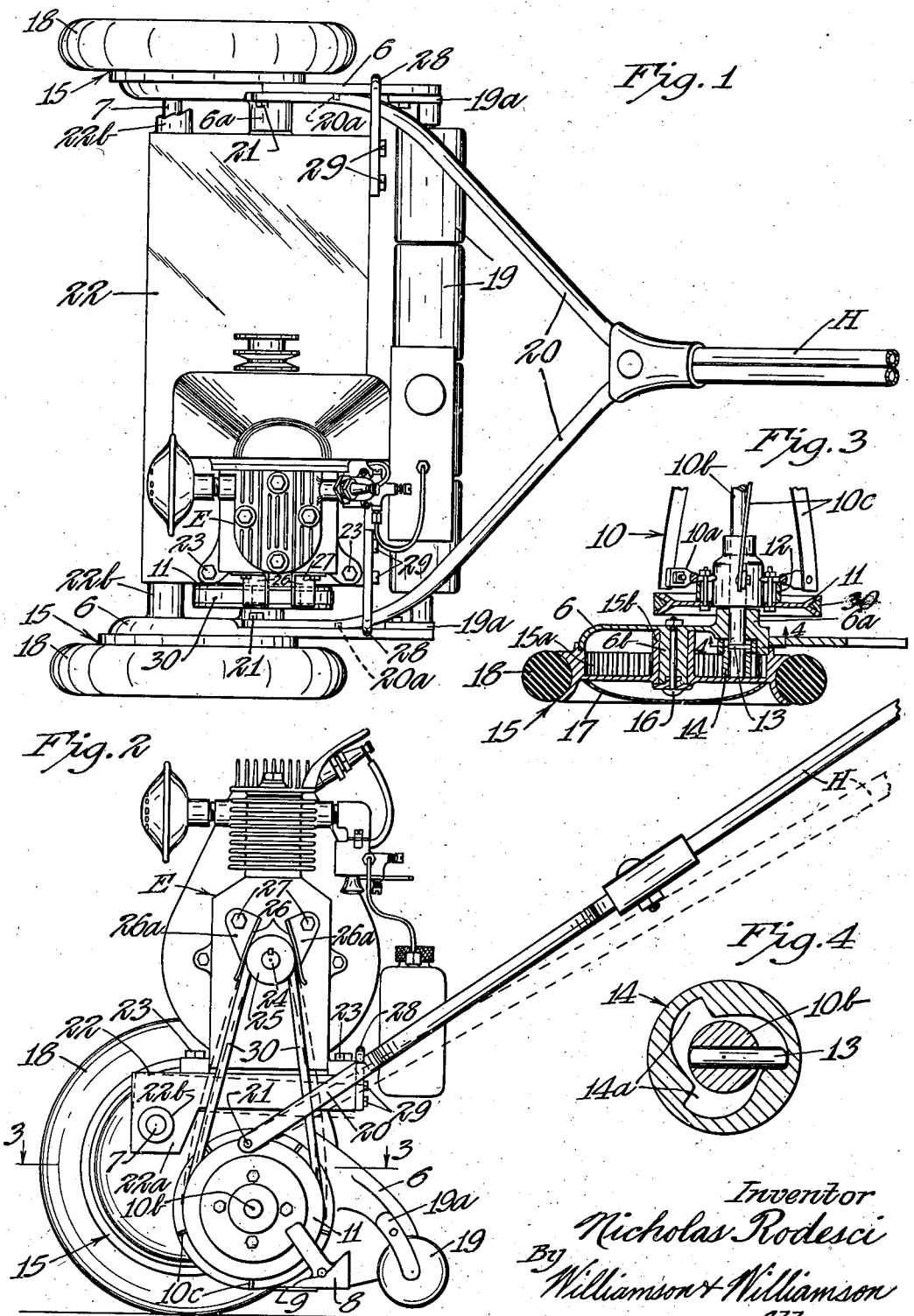

2,468,839

UNITED STATES PATENT OFFICE 2,468,839

POWER LAWN MOWER

Nicholas Rodesci, Minneapolis, Minn.

Application October 4, 1943, Serial No. 504,830

5 Claims. (Cl. 56—26)

This invention relates to power mowers for lawns and the like and to an improved simplified construction adapted to be manufactured as standard equipment or equally well adapted for completion by cooperation of a comparatively simple, power attachment with lawn mowers of standard construction.

It is an object of my invention to provide a simplified, highly efficient, power mower, eliminating the need for hand operated clutch and engine controls and utilizing the engine for driving the machine only when the operator grasps the handle in the usual manner to guide the machine in operation.

A further object of the invention is to provide a very simple and efficient power attachment which may be quickly and easily applied to any hand lawn mower to powerize the same, driving the cutter reel and traction wheels and requiring attention of the operator only to guide the machine along the desired path of travel.

Another object of the invention is the provision of a highly simplified, efficient power lawn mower structure adapted for long continued usage with the elimination of chains and driving gear to connect the source of power with the cutting mechanism and having the power exerted by the engine transmitted downwardly relatively to the ground or trailing roller to prevent any tendency of the machine to lift in tall or thick grass but on the contrary to always maintain a definite downward pressure behind the shear.

Still another object is the provision of a power mower or power attachment for lawn mowers with the engine mounted above the cutter reel and with provision for quick removal of the power unit to facilitate resharpening of blades.

Another object is the provision of a comparatively light power mower which can be readily lifted into a car, or truck, by a person of average strength, and which when the engine is not running may be pushed forwardly in upright position without revolving the cutter reel and which may be moved backwardly by lowering the handle and moving the machine upon the trailing roller only.

Still another object is the provision of an improved power mower of the class described which will not dig in when starting to move or advance and which makes efficient provision for slippage in power transmission to prevent injury to the cutter reel or blade when stones, sticks or other obstructions jam the blades against the shear.

More specifically it is an object to provide in a power mower utilizing the usual guiding handle which is connected to the frame for limited upward swinging movement, a power unit conveniently mounted above the cutter reel for upward swinging movement and having endless belt connections with the cutter reel for driving the same, so combined and associated with the said guiding handle that power is applied to the cutter reel and traction wheels only when the guiding handle is raised by the operator in the normal way for guiding the machine, and applying the power in such operation gradually.

My construction is particularly well suited for a power attachment comprising merely a substantially horizontal engine support with motor attached thereto and a pair of pulleys with an endless driving belt and abutment means associated with the engine support for engagement from beneath by the forked portion of the guiding handle of the mower. All other parts for my power unit may be supplied from the standard parts of practically all conventional hand propelled lawn mowers, it being necessary to reverse in such lawn mowers the dog-driven, driving pinions for drivably connecting the traction wheels with the cutter reel.

These and other objects and advantages of my invention will be more apparent from the following description made in connection with the accompanying drawings, wherein like reference characters refer to the same parts throughout the several views, and in which—

Figure 1 is a top plan view of an embodiment of my invention applied as an attachment to a hand lawn mower of conventional construction;

Figure 2 is a side elevation of the same with the near wheel and side plate removed;

Figure 3 is a fragmentary horizontal section taken on the line 3—3 of Figure 2;

Figure 4 is a detail vertical section taken on the line 4—4 of Figure 3 showing the conventional drive between one of the traction wheels and the cutter reel of the mower with the driving pinion reversed from its usual position in conventional hand mowers.

While it, of course, will be understood that my invention is well adapted for original manufacture as a power lawn mower, the embodiment illustrated in the accompanying drawings is a combination power mower constructed by mounting a power unit or attachment upon a conventional type of hand propelled lawn mower. The hand lawn mower shown comprises the usual frame having a pair of widely spaced side walls or frame plates 6, secured together and spaced apart at the upper and forward portions thereof by means of the transverse horizontal tie-rod 7 and having the adjustable blade holding bar 8 secured therebetween at the lower and rearward portion thereof, said bar being equipped with the conventional removable shearing blade 9 with which the revolving cutter reel cooperates. The cutter reel designated as an entirety by the numeral 10 is of conventional construction comprising a pair of spiders 10a, fixed at points adjacent the ends of the reel shaft 10b and carrying the spirally arranged cutter blades 10c. With my construction it may be necessary at one end of the cutter reel to slightly cut off the cutter blades 10c leaving a narrow space sufficient to accommodate a driven pulley 11, preferably of the V belt type which may be affixed as by clamping with the use of a spacing collar 12 to the end of the spider 10a. The cutter reel shaft 10b is journaled at its ends in suitable bearings 6a provided by frame plates 6 and the extremities thereof are extended in the usual fashion beyond the bearings 6a and are provided with diametrical apertures, in each of which is seated a removable driving pin or dog 13. The shaft is further extended at its ends beyond said driving dogs and dog-driven, wheel-driving pinions 14 surround such ends and are journaled thereon, said pinions being in mesh with relatively large internal gears 15a which are fixed to the fellies of the traction wheels 15. The traction wheels 15 have the usual annular hubs 15b which are journaled upon heavy studs 6b integrally formed or otherwise connected with the side frame plates 6 and attachment bolts 16 hold the traction wheels on said studs and may be covered together with the central portion of the wheels 15 by removable shell caps 17 made similar to the hub caps of motor vehicles. The wheels, as shown, have soft rubber tires 18 mounted on the fellies thereof.

The driving connections between the wheels and cutter reel, as described, are of conventional construction as used in hand propelled mowers with the exception, however, that in mounting my attachment on a hand mower the driving pinions 14 are reversed from their ordinary positions on the cutter reel shaft 10b; or in other words, the right hand driving pinion 14 is operatively placed upon the left hand end of the cutter reel shaft so that the dog receiving notches 14a formed in the interior and inner end of the pinion will be so engaged by the dog pin 13 that instead of the wheels driving the cutter reel in the proper direction, the driving of the cutter reel through my power attachment causes the traction wheels to be driven therefrom to advance the machine forwardly. The actual parts 14, dogs 13 and cutter reel shaft are utilized. The pinions 14 are merely reversed.

The hand mover is provided with the usual ground roller or trailer roller 19, which is shown as set up in sections mounted upon a roller shaft which is suitably and preferably adjustably mounted and journaled from brackets 19a attached to the lower and rear corners of frame sides 6. The mower is equipped with the conventional elongated guiding and pushing handle H having a wide bifurcated forward portion 20, the ends of which are pivoted in the usual manner by bolts 21 to the upper and central portions of the frame side 6. Said handle is mounted for limited swinging movement on a transverse horizontal axis and is limited in downward movement by suitable abutment lugs 20a extending inwardly from the frame sides 6 adjacent the upper edges thereof.

I provide a swinging substantially horizontal motor supported as shown in the form of a rather heavy flat rectangular platform 22 having downturned or depending flanges forming in effect an inverted pan, said platform being mounted a short distance above the top of the cutter reel and having, as shown, depending ears 22a at the forward ends thereof which are provided with bearing and spacing sleeves 22b for journaling upon, as shown, the tie rod 7 of the hand mower. The width of the platform 22 with the bearing sleeves 22b added thereto at the end thereof is such as to fit with nice clearance between side walls 6 of the frame, thereby constituting a swinging mounting pivoted on the forward portion of the frame preferably directly upon the tie rod 7.

A small compact internal combustion engine or other suitable power unit E of conventional type is secured as by heavy clamping bolts 23 to the top of the platform 22, its center of gravity being preferably substantially in vertical alignment with the cutter reel shaft 10b. The engine or power source E shown is provided (not shown) with suitable transmission mechanism mounted in the casing therefor and extending through the casing, and suitably journaled in bearings thereof is the power takeoff shaft 24 of the engine extending substantially in vertical alignment with the cutter reel shaft 10b and having attached at the end thereof adjacent one of the traction wheels, a pulley 25 preferably of smaller size than the pulley 11, and preferably of the V belt type. Pulleys 25 and 11 are substantially in vertical alignment and receive an endless, preferably V belt 30 of fairly stiff belt material, and adjusted to be of such length that in normal position of the platform 22 the V belt is slack and engine E will run without driving through pulley 25, the pulley 11 attached to the reel.

Above and at the front and rear sides of pulley 25, I mount a pair of belt retaining plates 26 which are disposed in slightly spaced substantially tangential relationship with pulley 25 converging upwardly from their lower ends and as shown having integrally formed wings 26a which are apertured for attachment purposes to receive clamping bolts 27 which may be threaded into the casing at the lower portion of the engine.

Suitable abutment arms or the equivalent are provided at the rear edge of platform 22 extending outwardly from the ends of said platform for engagement with the adjacent forked arms 20 of the guiding hand 8. As shown heavy rigid arms 28 are utilized, bolted by bolts 29 or otherwise firmly secured in proper position with reference to the rear flange of the platform and having abutment lower edges so disposed as to contact said fork arms 20 of the handle to limit downward swinging movement of the platform 22 at its free edge and to contact the handle fork arms 20 to cause lifting of the platform when the guiding handle H is raised. In other words, handle H more particularly the fork arms 20 are supported in the extreme lower position by the abutment lugs 20a extending inwardly from the side plate 6 of the frame and in turn said fork arms 20 support the swinging engine platform 22 through the abutment arms 28.

*Operation*

In operation the motor is started, the guiding handle H then being disposed in the lowered dotted line position of Figure 2. The power takeoff pulley 25 of the engine idles in the upper bite of the endless belt 20 and the device may be freely pushed forwardly if the guide handle is not raised or may be pulled rearwardly by tilting downwardly on the handle in taking the weight of the machine off the traction wheels 15.

When it is desired to operate the machine for cutting, the handle is raised as is normal for guiding purposes. Upon raising of the handle, the abutment arms 28 are lifted with the bifurcated end of the handle, the motor platform 22 being raised at its free or its rearward edge and thereby tensioning the belt 26 with the gradual application of power upon the cutter reel. The cutter reel is revolved in counterclockwise direction, as seen in Figure 2, and through the dog engagement by means of pin 13 at the notched inner end of the driving pinion 14, the traction wheels 15 are driven to advance the machine forwardly. The driving of the belt and the belt retainer element 26 at all times prevents the belt from slipping off the V pulleys. Belt driving, as is well known, particularly with a V belt, is highly efficient. Furthermore, it provides slippage in the driving connections in the event a stone, stick or other obstacle is encountered by the blades.

It will be noted that the application of power to the cutter mechanism is downwardly, thereby urging the rear portion of the machine downwardly against the ground rather than causing any tendency of lifting of the rear of the machine which is prevalent with conventional power mowers upon the market.

The gradual application of power through the easy upwardly swinging of handle H and with the engine support, prevents any sudden jerking or digging of the machine as power is applied to the cutter reel.

It will be apparent that when it is necessary to resharpen the blades, the motor support 22 with the motor thereon may be quickly disconnected from the machine, lifted off and the blades resharpened in a conventional way.

If for any reason the motor needs repair or cannot be used, the device can very quickly be converted to a hand propelled lawn mower by simply removing the wheels 15, and thereafter the driving pinions 14, and reversing the positioning of the driving pinions on the pivot ends of the cutter reel shaft 10b.

From the foregoing description it will be seen that I have provided a very simple, light and highly efficient power lawn mower as well as a construction which lends itself particularly well as an attachment to conventional hand propelled lawn mowers now extensively used.

It will, of course, be understood that various changes may be made in the form, details, arrangement and proportions of the parts without departing from the scope of my invention.

What I claim is:

1. In a power mower having traction wheels, a frame, a cutter reel and a guiding handle extended rearwardly and upwardly from said frame and connected therewith on a transverse axis for limited upward swinging movement as essential elements, precisely, the combination of an engine support pivotally mounted on said frame above said cutter reel for upward swinging movement on a horizontal axis extending transversely of said frame, an engine mounted on said support rearwardly of said swinging axis having a driving pulley disposed above one end of said cutter reel, a driven pulley fixed to said end of said cutter reel and lying substantially in a vertical plane with said driving pulley, an endless belt connecting said pulleys for driving, said belt being of a length to cause idling of said engine when said support is in a lowered position, driving mechanism interposed between said cutter reel and said traction wheels for driving said traction wheels in a forwardly advancing direction and abutment means connected with said platform and extending outwardly therefrom in line with the arc of movement described by said handle when the same is moved on its pivot, said abutment means cooperating with said handle so that when the handle is in a raised position the said platform is pivoted upward to tension said belt for driving purposes and when the handle is lowered said platform pivots downwardly to automatically disconnect the drive between said pulleys.

2. A power attachment for hand propelled lawn mowers of the type having a pair of traction wheels, a frame, a handle having bifurcated inner ends extending rearwardly and upwardly from said frame and pivotally mounted at its inner ends of the frame for limited upward swinging movement, a cutter reel mounted across said frame and driving pinions interposed between said traction wheels and the two ends of said cutter reel with dog clutch driving connections, causing said reel shaft to be driven for cutting when said wheels are propelled forwardly and disengaging driving of said reel when the mower is drawn rearwardly, comprising an engine support mounted on said frame above said reel with its forward portion swingably connected with said frame, provision for limited elevation thereof, abutment means mounted at the rear of said support and extending laterally therefrom and overhanging the inner ends of said handle for cooperation with said handle for swinging said support upwardly relative to said cutter reel when said handle is swung upwardly, said power attachment including the reversal of said driving pinions from the respective ends of said cutter reel to cause said reel to drive said traction wheels forwardly when said reel is revolved in a direction for cutting, an engine mounted on said support and having a rotary driving element disposed above one end of said cutter reel, a driven element fixed to said end of said cutter reel and an endless flexible driving member trained about said driving element and said driven element and being of such length to cause idling of said engine when the handle of said mower is in lowered position and to cause driving of said reel and said traction wheels when the handle of said lawn mower is raised slightly into the normal guiding position.

3. A power attachment for hand propelled lawn mowers of the type in which a handle having bifurcated inner ends is pivotally mounted to the frame thereof comprising as essential elements only, a motor support disposed above the cutter reel of the mower and having means at its forward edge for swingably connecting with the front tie rod of a lawn mower, a motor mounted on said support and having a power take-off pulley disposed rearwardly of said tie rod and with its axis parallel therewith and above one end of the cutter reel, a pulley fixed to said cutter reel below said power take-off pulley, an endless belt trained about said pulley and of a length to be loosely disposed thereon when said support is in lowered position and abutment means mounted at the rear of said support and extending outwardly therefrom in line with the arc of movement described when said handle is elevated, said abutment means cooperating with the inner ends of said handle so that when the handle is in a raised position the said support is pivoted upwardly to tension said belt and effect the drive of said cutting reel.

4. A power lawn mower having in combination as essential elements a pair of traction wheels, a frame, a handle, cutter mechanism having a revoluble member, pinion driving connections between said cutter mechanism and said wheels for driving said wheels forwardly when said cutter mechanism is operatively driven, a forward horizontal tie rod connecting sides of said frame, an engine supporting platform mounted across said frame above said cutter mechanism and having swingable connection at its forward portion with said tie rod, an engine mounted on said platform rearwardly of said swingable connection, a driven pulley fixed to said revoluble member, said engine having a power takeoff disposed above said driven pulley, an endless belt connecting said power connection and said pulley and of a length to cause idling of said engine when said support is in lowered position and the handle having bifurcated inner ends pivotally connected to said frame, and abutment means mounted at the rear of said motor support and extending outwardly therefrom in line with the arc of movement described by the bifurcated ends of the handle when said handle is moved on its pivot, said abutment means cooperating with the bifurcated ends of said handle when said handle is raised to effect upward pivotal movement of said engine platform to tighten said belt and drive said revoluble member.

5. A power lawn mower comprising a frame including spaced side members, a cutter mechanism including a cutting reel rotatably mounted between said side members, a transverse supporting member connected between the respective side members and disposed forwardly and above the axis of said cutting reel, an engine supporting platform pivotally mounted on said supporting member and between the said frame and over the axis of said cutting reel, an engine mounted on said platform adjacent one side thereof and including a power take-off shaft disposed in substantial vertical alignment with the axis of said cutting reel, a pulley on said power take-off shaft, a pulley mounted on one end of said cutting reel of larger diameter than and in vertical alignment with the pulley on said power take-off shaft, traction wheels mounted exteriorly of the side members of said frame, gearing connection between said traction wheels and said cutting reel of such character that rotation of said cutting reel likewise effects rotation of said traction wheels, a bifurcated pushing handle pivotally mounted on said frame, the inner ends of the bifurcated portion being disposed substantially parallel therewith, a loose traction belt trained over both of said pulleys, said belt being of such length that there is insufficient tension thereon to effect the drive of the pulley on said cutter reel when said motor support is in its lowermost position, abutment means mounted at the rear of said motor support and extending outwardly therefrom in line with the arc of movement described by the bifurcated ends of the handle when said handle is moved on its pivot, said abutment means cooperating with the bifurcated portions of said handle so that when the handle is in a raised position the motor is pivoted upwardly to thereby tension the said belt for driving purposes and when the handle is lowered said motor support pivots downwardly to automatically disconnect the drive between said pulleys.

NICHOLAS RODESCI.

REFERENCES CITED

The following references are of record in the file of this patent:

UNITED STATES PATENTS

| Number | Name | Date |
|---|---|---|
| 2,151,659 | Funk | Mar. 21, 1939 |
| 2,156,701 | Petersen | May 2, 1939 |
| 2,160,259 | Cooper | May 30, 1939 |
| 2,220,705 | Burckes | Nov. 5, 1940 |
| 2,247,333 | Funk | June 24, 1941 |
| 2,256,583 | Squires | Sept. 23, 1941 |
| 2,285,230 | Roberton | June 2, 1942 |
| 2,292,580 | Moyer et al. | Aug. 11, 1942 |